United States Patent
Gaster (10) Patent No.: US 9,588,804 B2
(45) Date of Patent: Mar. 7, 2017

(54) SYSTEM AND METHOD FOR SYNCHRONOUS TASK DISPATCH IN A PORTABLE DEVICE

(71) Applicant: QUALCOMM INCORPORATED, San Diego, CA (US)

(72) Inventor: Benedict Rueben Gaster, Santa Cruz, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 72 days.

(21) Appl. No.: 14/160,385

(22) Filed: Jan. 21, 2014

(65) Prior Publication Data

US 2015/0205632 A1   Jul. 23, 2015

(51) Int. Cl.
*G06F 9/48* (2006.01)
*G06F 9/54* (2006.01)

(52) U.S. Cl.
CPC .......... *G06F 9/4843* (2013.01); *G06F 9/4856* (2013.01); *G06F 9/547* (2013.01)

(58) Field of Classification Search
CPC .... G06F 9/4806–9/4893; G06F 9/5088; G06F 9/52; G06F 9/526; G06F 9/547
See application file for complete search history.

(56) References Cited

U.S. PATENT DOCUMENTS 6,868,437 B1    3/2005  Gary
8,566,831 B2 * 10/2013  Jellinek ................ G06F 9/5044
                                                                718/102
9,286,116 B2 *  3/2016  Wang .................... G06F 9/4856
2002/0178313 A1* 11/2002  Gary ....................... G06F 9/547
                                                                710/260
2003/0110203 A1*  6/2003  Brenner ................ G06F 9/4843
                                                                718/103

(Continued)

OTHER PUBLICATIONS

Keate, "A Real-World Approach to Benchmarking DSP Real-Time Operating Systems"; 1997 IEEE; [retrieved on Jun. 4, 2015]; Retrieved from Internet <URL:http://ieeexplore.ieee.org/stamp/stamp.jsp?tp=&arnumber=632370>;pp. 418-424.*

(Continued)

*Primary Examiner* — Geoffrey St Leger
(74) *Attorney, Agent, or Firm* — Smith Tempel (57) ABSTRACT

A portable computing device synchronously offloads tasks from a first processing resource to an alternative processing resource. Offload requests are centralized and communicated to a dispatch controller. The request defines the alternative processing resource and the location of items in a common or shared memory related to a thread that is desired to be transferred or dispatched from the primary processing resource to the identified alternative processing resource. The dispatch controller, in response to the request, creates a task dispatch packet that provides the information required to switch the context of the thread that was previously executing on the primary processing resource to the alternative processing resource. The common or shared memory space is leveraged to provide desired performance. Results generated by the alternative processing resource are available in the shared memory space upon return to the primary processing resource.

27 Claims, 9 Drawing Sheets

(56) References Cited

U.S. PATENT DOCUMENTS

| | | | |
|---|---|---|---|
| 2005/0125793 A1* | 6/2005 | Aguilar | G06F 9/4843 718/100 |
| 2007/0033592 A1* | 2/2007 | Roediger | G06F 9/5044 718/102 |
| 2008/0244227 A1* | 10/2008 | Gee | G06F 1/3203 712/30 |
| 2009/0089792 A1* | 4/2009 | Johnson | G06F 9/4881 718/105 |
| 2009/0187912 A1* | 7/2009 | Lee | G06F 9/4856 718/103 |
| 2011/0022817 A1* | 1/2011 | Gaster et al. | 711/202 |
| 2012/0110303 A1 | 5/2012 | Dhanwada et al. | |
| 2012/0124588 A1* | 5/2012 | Sinha et al. | 718/102 |
| 2012/0198458 A1* | 8/2012 | Hartog et al. | 718/102 |
| 2012/0222033 A1* | 8/2012 | Byrum | G06F 9/5044 718/102 |
| 2012/0331278 A1 | 12/2012 | Breternitz et al. | |
| 2013/0243329 A1 | 9/2013 | Oro García et al. | |
| 2013/0262784 A1 | 10/2013 | Asaro et al. | |
| 2013/0263144 A1* | 10/2013 | Sander et al. | 718/102 |
| 2014/0130051 A1* | 5/2014 | Fleischer | G06F 9/46 718/102 |
| 2014/0359636 A1* | 12/2014 | Xu | G06F 9/4856 718/108 |

OTHER PUBLICATIONS

Chen, Y-S., et al., Online Real-Time Task Scheduling in Heterogeneous Multicore System-on-a-Chip, IEEE Transactions on Parallel and Distributed Systems, vol. 24, Issue: 1, Jan. 2013, 13 pages,[retrieved on Dec. 6, 2016], Retrieved from the Internet: <URL:http://ieeexplore.ieee.org/>.*

Lis, M., et al., Hardware-level thread migration in a 110-core shared-memory multiprocessor, Hot Chips 25 Symposium (HCS), 2013, 27 pages, [retrieved on Dec. 6, 2016], Retrieved from the Internet: <URL:http://ieeexplore.ieee.org/>.*

Mark Gardner et al, "Characterizing the Challenges and Evaluating the Efficacy of a CUDA-to-OpenCL Translator," synergy.cs.vt.edu, Journal of parallel computing; Sep. 17, 2013.

Guerrieri R., et al., "Design Methodology for Multi Processor Systems Design on Regular Platforms," University of Bologna, Publication date unknown.

International Search Report and Written Opinion—PCT/US2015/012283—ISA/EPO—Apr. 24, 2015.

\* cited by examiner

FIG. 9

SYSTEM AND METHOD FOR SYNCHRONOUS TASK DISPATCH IN A PORTABLE DEVICE

DESCRIPTION OF THE RELATED ART

Computing devices are ubiquitous. Some computing devices are portable such as smartphones, tablets and laptop computers. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. As the functionality of such portable computing devices increases, the computing or processing power required and generally the data storage capacity to support such functionality also increases.

Some conventional designs for handheld portable computing devices include multiple processors and/or processors with multiple cores to support the various primary and peripheral functions desired for a particular computing device. Such designs often integrate analog, digital and radio-frequency circuits or functions on a single substrate and are commonly referred to as a system on a chip (SoC). Consumers want improved battery life, size, and weight for their laptops, tablets, and smartphones. The ability to shift processing work to components within the SoC is a consideration for both power management and user experience. The ability to remove power from some resources can provide significant power savings when user requirements do not require the full spectrum of processing resources available on the SoC. The ability to shift some tasks to a processing resource more efficient at processing the requested task can both save power and provide performance gains.

However, the cost of managing the transfer of a task from one processing resource to another can prevent the task from being offloaded at all as there may not be enough work to recoup the latency associated with managing the transfer. In addition, such transfers can only be performed when time permits to manage the transfer, complete the task and return the result to the requester. That is, such transfers in conventional computing models are managed asynchronously. While user mode queuing provides a potential solution for significantly decreasing the latency associated with managing task transfers from one processing resource to another, the proposed model relies on the premise that all such transfers are asynchronous.

Thus, there is a need for improved mechanisms for managing task transfers between processing resources that may be applied to situations that require other than asynchronous solutions.

SUMMARY OF THE DISCLOSURE

Example embodiments of systems and methods are disclosed that configure a portable computing device to synchronously offload processing tasks from a first processing resource to an alternative processing resource. Task offload requests are centralized from a host or primary processing resource, which in an example arrangement is a SoC's central processing unit. The disclosed systems and methods enable a device such as graphics processing unit or a digital signal processor to remain autonomous. Thus, allowing these elements to remain separate from the SoC's central processing unit.

The host or primary processing resource generates a task offload request or request that is communicated to a dispatch controller. The request defines the alternative processing resource and the location of items in a common or shared memory related to a thread that is desired to be transferred or dispatched from the primary processing resource. The items stored in the shared memory or thread related items may include code, data or both code and data. The dispatch controller, in response to the request, creates a task dispatch packet that provides the information required to switch the context of the thread that was previously executing on the primary processing resource to the alternative processing resource. The common or shared memory space is leveraged to provide desired performance. The host or primary processing resource waits for an indication from the dispatch controller that the task is complete before resuming execution of the thread. Results generated while the thread is executed in the alternative processing resource are readily available in the common or shared memory space upon return to the primary processing resource. Alternatively, when no further instructions are to be processed, the primary processing resource communicates a notice to an operating system that the thread is complete.

An example embodiment of a computing device includes a primary processing resource, a secondary or alternative processing resource arranged to communicate with a dispatch controller in a device execution environment. The dispatch controller synchronously manages function calls received from the primary processing resource. A common or shared memory space is accessible to both the primary processing resource and the secondary processing resource. The primary and the secondary processing resources are arranged to both generate and respond to respective signals in accordance with a signal/wait interface.

An example embodiment of a method for synchronous task dispatch in a portable computing device includes the steps of arranging a portable computing device with a primary processing resource, a secondary processing resource and a shared memory space accessible to the primary processing resource and the secondary processing resource, detecting a task offload condition, suspending execution of a thread executing in the primary processing resource, generating a request from the in response to the task offload condition, and communicating the request to a dispatch controller, the request identifying the secondary processing resource for execution of the thread.

Another example embodiment of a computing device includes multiple processing resources or means for processing a thread, a first means for processing a thread includes a mechanism for detecting a task offload condition on the portable computing device. A mechanism or means for synchronously dispatching the thread is responsive to the task offload condition. A second or alternative processing means for executing the thread is responsive to the means for synchronously dispatching the thread.

Another example embodiment is a non-transitory processor-readable medium having stored therein processor instructions and data that direct the processor to perform various functions including detecting a task offload condition, suspending execution of a thread executing in a primary processing resource, generating a request in response to the task offload condition and communicating the request to a dispatch controller, the request identifying a secondary processing resource different from the primary processing resource for execution of the thread.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

Although described with particular reference to operation within a PCD, the described systems and methods may be applicable to any computing system with multiple processing resources where it may be useful to autonomously and synchronously offload tasks from one processing system to an alternative processing system. Stated another way, the computing systems and methods disclosed herein are applicable to desktop computers, server computers or any electronic device with multiple processing resources.

Figure 1:
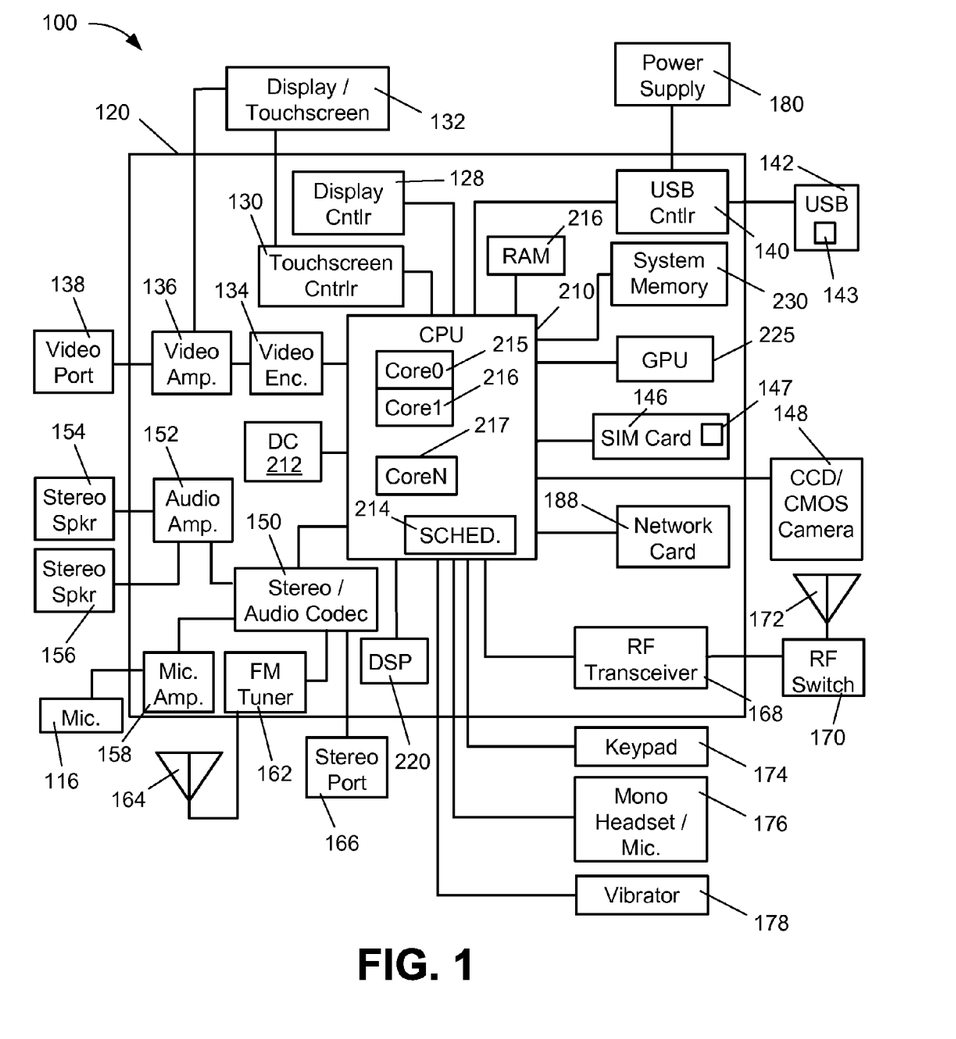
FIG. 1 is a schematic diagram illustrating an example embodiment of a computing device arranged as a SoC.

Reference is now directed to the illustrated examples. An example embodiment of a non-limiting aspect of a portable computing device (PCD) supported by a SoC is shown and is generally designated 100. The PCD 100 includes an on-chip system 120 that includes a multicore CPU 210. The multicore CPU 210 includes a zero$^{th}$ core 215, a 1$^{st}$ or first core 216, and an N$^{th}$ core 217. Each of the N cores are independent from each other and arranged to process instructions such as add, move data, branch, etc. The multicore CPU 210 executes software that manages a schedule as indicated by scheduler 214. Alternatively, the multicore CPU 210 or another portion of the SoC 120 is arranged with a hardware (i.e., a circuit) element or a set of hardware elements configured to enable a task scheduler.

As illustrated in FIG. 1, a display controller 128 and a touch screen controller 130 are coupled to the multicore CPU 210. In turn, display/touchscreen 132, external to the on-chip system 120, is coupled to the display controller 128 and the touch screen controller 130. A video encoder 134, e.g., a phase alternating line (PAL) encoder, a sequential couleur a memoire (SECAM) encoder, or a national television system(s) committee (NTSC) encoder, is coupled to the multicore CPU 210. Further, a video amplifier 136 is coupled to the video encoder 134 and the display/touchscreen 132. Also, a video port 138 is coupled to the video amplifier 136. As depicted in FIG. 1, a universal serial bus (USB) controller 140 is coupled to the multicore CPU 210. A USB storage device 142 is coupled to the USB controller 140. A system memory 230 and a subscriber identity module (SIM) card interface 146 may also be coupled to the multicore CPU 210 with the connection 219 between the multicore CPU 210 and the system memory 230 consisting of two or more physical channels or paths for transferring data between these elements of the on-chip system 120. Further, as shown in FIG. 1, a digital camera 148 may be coupled to the multicore CPU 210. In an exemplary aspect, the digital camera 148 is a charge-coupled device (CCD) camera or a complementary metal-oxide semiconductor (CMOS) camera.

As illustrated in FIG. 1, a stereo audio CODEC 150 may be coupled to the multicore CPU 210. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 116 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, a stereo port 166 may be coupled to the stereo audio CODEC 150.

FIG. 1 also indicates that a radio frequency (RF) transceiver 168 is coupled to the multicore CPU 210. An RF switch 170 may be coupled to the RF transceiver 168 and an RF antenna 172. As shown in FIG. 1, a keypad 174 is coupled to the multicore CPU 210. Also, a mono headset with a microphone 176 may be coupled to the multicore CPU 210. Further, a vibrator device 178 may be coupled to the multicore CPU 210. FIG. 1 further shows that a power supply 180 may be coupled to the on-chip system 120 via the USB controller 140. In a particular aspect, the power supply 180 is a direct current (DC) power supply that provides power to the various components of the PCD 100 that require power. Further, in a particular aspect, the power supply 180 is a rechargeable DC battery or a DC power supply that is derived from an alternating current (AC) to DC transformer that is connected to an AC power source (not shown).

FIG. 1 further indicates that the PCD 100 may also include a network card 188 that may be used to access a data network, e.g., a local area network, a personal area network, or any other network. The network card 188 may be a Bluetooth network card, a WiFi network card, a personal area network (PAN) card, or any other network card well known in the art. Further, the network card 188 may be incorporated in an integrated circuit. That is, the network card 188 may be a full solution in a chip, and may not be a separate network card 188.

The SoC 120 is also arranged with a random access memory (RAM) 216, a dispatch controller (DC) 212, a digital signal processor (DSP) 220, and a graphics processing unit (GPU) 225. In the illustrated embodiment, each of these elements is represented as a single hardware element or unit. However, it should be understood that as with the multicore CPU 210, each the RAM 216, DC 212, DSP 220 and the GPU 225 may include multiple instances or copies of circuit components, such as arithmetic logic units or other computing elements designed for specific tasks (e.g., circuits for pixel shading, geometry shading, vector processing, etc.), as may be desired. In addition, it should be understood that a first set of one or more functions associated with any of these elements, including the DC 212, can be implemented in hardware or a combination of hardware and firmware, while a second or remaining set of one or more functions associated with the respective element or elements can be implemented in software that is executed by a suitable processor for executing the instructions stored in the software.

As depicted in FIG. 1, the display/touchscreen 132, the video port 138, the USB port 142, the camera 148, the first stereo speaker 154, the second stereo speaker 156, the microphone 116, the FM antenna 164, the stereo port 166, the RF switch 170, the RF antenna 172, the keypad 174, the mono headset 176, the vibrator 178, and the power supply 180 are external to the on-chip system 120.

RF transceiver 168, which may include one or more modems, supports one or more of global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE and PDD/LTE wireless protocols.

In the illustrated embodiment, a single instance of a multi-core CPU 210 is depicted. However, it should be understood that any number of similarly configured multi-core CPUs can be included to support the various peripheral devices and functions associated with the PCD 100. Alternatively, a single processor or multiple processors each having a single arithmetic logic unit or core could be deployed in a PCD 100 or other computing devices to support the various peripheral devices and functions associated with the PCD 100 as may be desired.

The illustrated embodiment shows a system memory 230 that is arranged within a fully integrated on-chip system 120. However, it should be understood that two or more vendor provided memory modules having a corresponding data storage capacity of M bytes may be arranged external to the on-chip system 120. When arranged external to the on-chip system 120, the various memory modules supporting the system memory 230 are coupled to the CPU 210 by way of a modified multiple channel memory bus (not shown) including suitable electrical connections for transferring data and power to the memory modules.

In a particular aspect, one or more of the method steps described herein may be enabled via a combination of hardware elements (e.g., the multicore CPU 210, DSP 220, GPU 225) as supported by data and processor instructions stored in the system memory 230 that are retrieved as desired by one or more cores of the multicore CPU 210 or other hardware elements and buffered in the RAM 216, an internal cache (not shown), or the various registers (not shown) within the multicore CPU 210. Those skilled in the art of designing CPUs, DSPs, and GPUs are familiar with a number of various techniques for managing and manipulating data and processing instructions to support various applications executing on the PCD 100.

Figure 2:
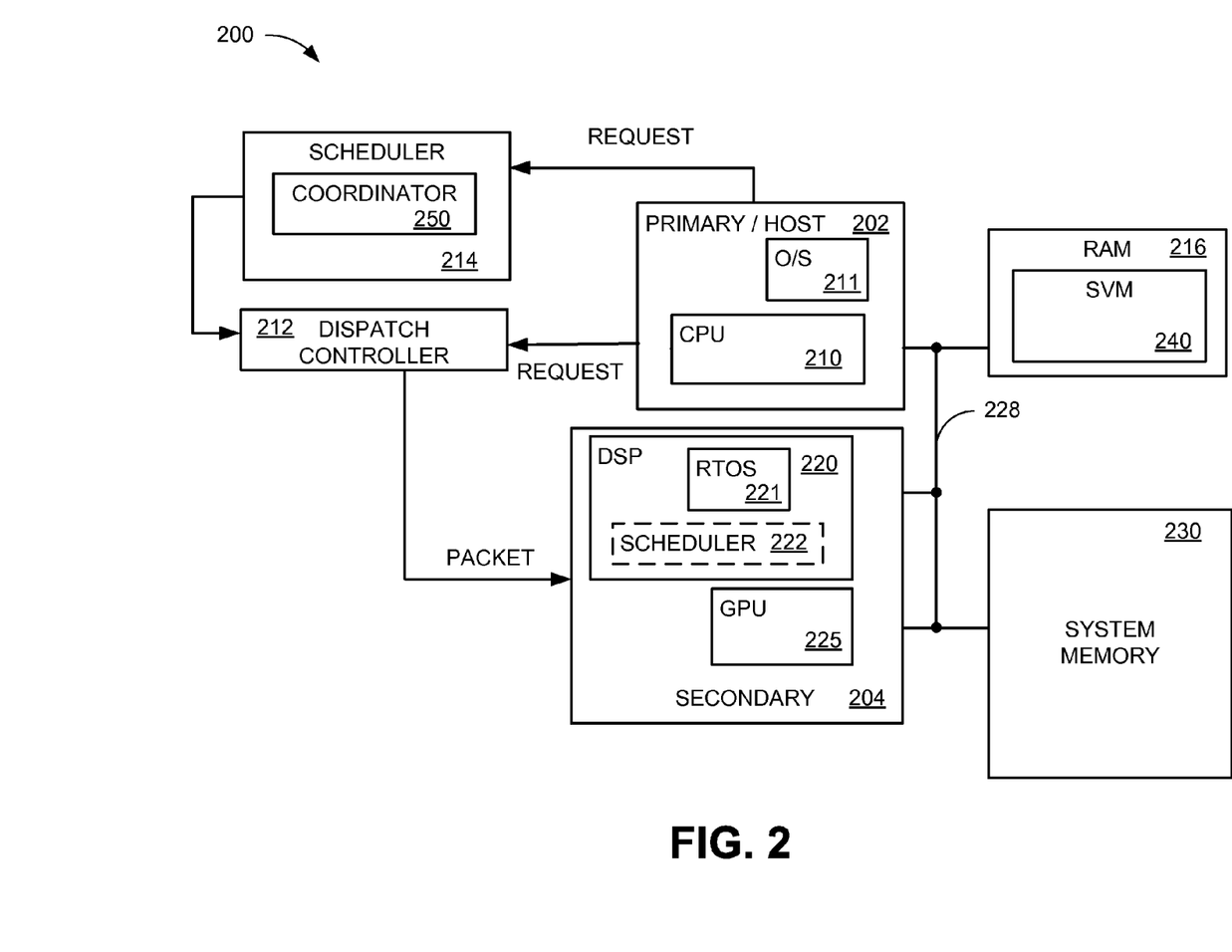
FIG. 2 is schematic diagram illustrating an example embodiment of a subsystem for synchronously managing the dispatch of tasks from a primary processing resource to a secondary processing resource in the SoC of FIG. 1.

FIG. 2 is schematic diagram illustrating an example embodiment of a subsystem for synchronously managing the dispatch of tasks from a primary processing resource to a secondary processing resource in the SoC 120 introduced in FIG. 1. As illustrated, the subsystem 200 includes volatile and non-volatile memory elements such as RAM 216 and system memory 230 coupled to a primary processing resource 202 and a secondary processing resource by a bus 228. The primary processing resource or host 202 includes the multi-core CPU 210 introduced in FIG. 1 and executes an operating system such as O/S 211. As is known, the O/S 211 acts as an intermediary between applications or programs and hardware in the PCD 100. Although application code is executed by the hardware such as CPU 210, the application code will frequently interact with the O/S 211 or be interrupted by the O/S 211 as the O/S 211 manages PCD resources and provides common services for other applications or programs on the PCD 100.

In a default mode of operation, the primary processing resource 202 is used to execute applications or programs on the PCD 100. In an alternative mode of operation, the primary processing resource 202 executes a run-time interface that dynamically determines an optimal solution for dividing work in the form of tasks or threads between the primary processing resource 202 and one or more of the available secondary processing resource(s) 204. Alternatively, each program or application can be compiled in such a way to direct the primary processing resource 202 when to forward certain threads or tasks to the secondary processing resource 204. However, arranged, the primary processing resource or host 202 responds to the detection of an offload condition by generating and forwarding a request to offload the task to the secondary processing resource 204, which in the illustrated example may be one or more instances or copies of a DSP 220 or a GPU 225. In other arrangements (not shown), field programmable gate arrays (FPGAs), arithmetic logic units (ALUs) or other devices may be used to process portions of some threads. As indicated in FIG. 2, the offload requests are indirectly communicated to the secondary processing resource 204. A first path or branch uses a scheduler 214, while a second branch or path uses a dispatch controller 212 to communicate with the secondary processing resource 204.

An asynchronous dispatch request is generated by the primary processing resource 202 and communicated to the scheduler 214. The scheduler 214 includes a coordinator element 250 for managing priorities and one or more additional inputs to determine when to forward the request to the dispatch controller 212. A synchronous dispatch request is communicated to the dispatch controller 212. Whether the request is received indirectly and asynchronously from the scheduler 214 or directly and synchronously from the primary processing resource 202, the dispatch controller 212 generates a dispatch packet, which provides all the information needed for the secondary processing resource 204 defined in the dispatch packet information to execute the offloaded thread. The shared virtual memory space 240 within the RAM 216 is leveraged to provide the context of the thread to the secondary processing resource 204 and upon thread completion is available for continued processing by the primary processing resource 202.

In response to one or more input signals received by the primary processing resource 202 and/or one or more internally identified conditions such as those generated within an operating system or one or more application programs executing within the primary processing resource 202, a task offload condition is generated. When identified by the primary processing resource 202, the task offload condition directs the primary processing resource 202 to suspend the executing thread desired to be shifted to the secondary processing resource 204 and generates a low-latency (e.g., approximately 1 nS or less) signal/wait indicator. An example signaling construct need not include data and may include a set of instructions such as sigresourcealloc_ signal( ), signal(sigresource); and wait(sigresource). The example signaling construct is exposed and/or extended to processing resources and other elements used to support the processing resources in the PCD 100.

The primary processing resource 202 preferably suspends the executing thread before generating and communicating the request to offload the thread to the secondary processing resource 204. This suspension blocks the thread from restarting on the primary processing resource 202 until a task complete signal is returned to the primary processing resource 202. The request issued by the primary processing resource 202 is analogous to a function call and includes information that identifies a particular instance and type of the secondary processing resource 204 to be used to execute the offloaded portion of the thread.

Dispatch of the offloaded thread is indirect in that the primary processing resource 202 is coupled to the secondary processing resource 204 via the dispatch controller 212. Although illustrated as a single element, it should be understood that a dispatch controller instance is used for each thread that is offloaded or transferred from the primary processing resource 202 to a secondary processing resource 204. For example, if the multicore CPU 210 includes four processing cores and two of the processing cores have separately identified task offload conditions, then at least two instances of a dispatch controller 212 will be used to generate and forward respective dispatch packets to separately identified secondary processing resources such as the DSP 220 and the GPU 225. The dispatch controller 212 can be implemented as a hardware element or in software executing on the primary processing resource 202 or host. Furthermore, the dispatch controller 212 could be implemented with some functions implemented in hardware elements such as adders and registers, among other devices and other functions implemented in software by processing resources coupled to the registers or other storage elements.

The dispatch packet provides no dependency control. That is, everything submitted to and forwarded by the dispatch controller 212 is ready for execution. The dispatch controller 212 generates a dispatch packet that not only identifies the secondary processing resource 204, but provides the identified alternative processing resource with a single space of work items (e.g., a NDRange), which can be one, two or three dimensional. For example, if it is desired to apply a filter to each pixel in a 960×640 image, the thread would identify 960×640 work items that each apply the filter to a pixel in the image, namely work item (x, y) applies the filter to pixel (x, y). Upon completion, the secondary processing resource 204 provides a task/thread complete signal to the dispatch controller 212 that issued the dispatch packet. In turn, the dispatch controller 212 forwards an indication of the same to the primary processing resource 202. The primary processing resource 202 may communicate the same to the O/S 211 executing on one or more of the remaining cores of the multicore CPU 210. As arranged, the dispatch controller 212 guarantees that a dispatch request is issued to and serviced by a secondary processing resource 204 that is available for execution of the thread. Moreover, the dispatch controller 212 will maintain a relationship between the set of requests and the dispatch packets, which further defines a one-to-one relationship between a particular thread and a processing resource on the PCD 100.

As further illustrated in FIG. 2, a global coordinator or scheduler 214 is provided to receive offload requests and asynchronously generate dispatch commands to the dispatch controller 212. The global coordinator or scheduler 214 provides a means or mechanism for scheduling tasks offloaded by a primary processing resource 202. The global coordinator or scheduler is suitable for directing the completion of tasks associated with applications executed on the PCD 100. The global coordinator 214 or scheduler is arranged with one or more instances or copies of a coordinator 250 that generates and issues the dispatch commands in response to the one or more requests received from the primary processing resource 202. Each coordinator 250 may execute or include a micro-scheduler configured to initiate dispatch commands to the dispatch controller(s) 212.

In an optional or alternative arrangement, the DSP 220 is arranged with a real-time operating system (RTOS) 221 to process dispatch packets in response to task offload conditions. The RTOS 221 serves real-time requests as received with minimal buffering delays. The scheduler 222 provides a predictable execution pattern for embedded systems within the PCD 100. The scheduler 222 further provides an alternative means or mechanism for scheduling tasks offloaded by a primary processing resource 202. The RTOS 221 responds within a strictly defined time or deadline. In this alternative arrangement, the DSP 220 issues requests to offload tasks to other processing resources such as the GPU 225 by way of an instance or copy of a dispatch controller 212.

As described, a first means or mechanism for processing a thread includes a primary processing resource or host 202. A secondary or alternative means or mechanism for processing a thread includes one or more of a DSP 220, a GPU 225, an ALU (not shown) or other circuits or processors. A means or mechanism for synchronously dispatching a thread previously being executed within the primary processing resource or host 202 includes a dispatch controller 212. The first means for processing a thread may be arranged to communicate offload requests directly to the dispatch controller 212 or indirectly through a scheduler 214. In this regard, the scheduler 214 and the one or more coordinators 250 functioning under the direction of the scheduler 214, provides a means for asynchronously receiving a request from the first means for processing the thread. The scheduler 214 may also be considered a global coordinator or a means or mechanism for scheduling the execution of tasks in a computing environment. As further described, the GPU 225 provides a means or mechanism for processing graphics commands.

Figure 3:
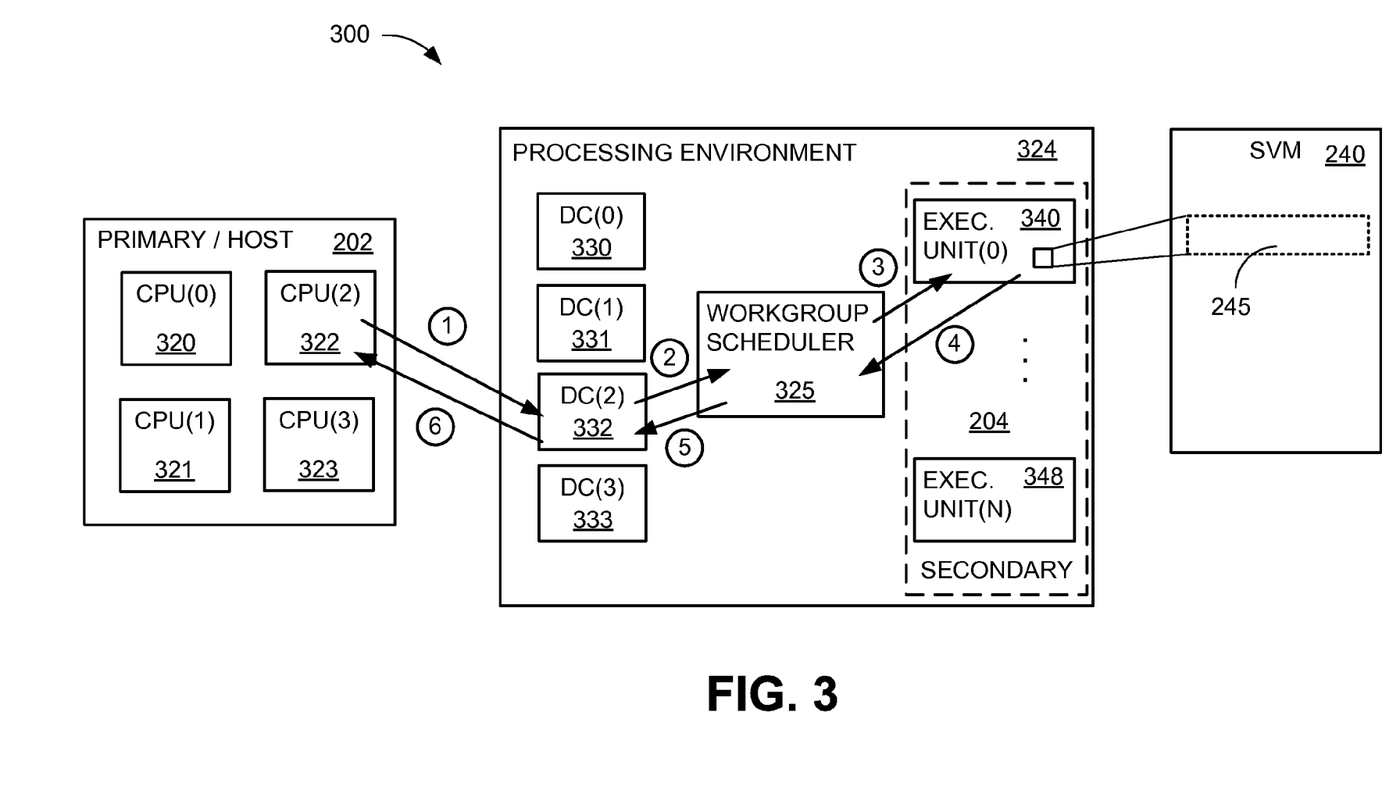
FIG. 3 is a schematic diagram illustrating an example embodiment of a computing environment that manages the dispatch of tasks in the SoC of FIG. 1.

FIG. 3 is a schematic diagram illustrating an example embodiment of a computing environment 300 that manages the dispatch of tasks or threads from a primary processing resource to a secondary processing resource in the SoC 120 of FIG. 1. The computing environment 300 includes the primary processing resource or host 202, an alternative processing environment 324 and the shared virtual memory 240. The primary processing resource 202 includes multiple CPUs, computing elements, or cores. In the illustrated embodiment, the primary processing resource 202 includes CPU(0) 320, CPU(1) 321, CPU(2) 322 and CPU(3) 323. However, it should be understood that fewer computing elements, more computing elements or a blend of various different computing elements can be included in the host or primary processing resource 202 within a PCD 100.

The processing environment 324 includes a set of dispatch controllers (i.e., DC(0) 330, DC(1) 331, DC(2) 332 and DC(3) 333) in a one-to-one relationship with the primary processing resources, (i.e., CPU(0) 320, CPU(1) 321, CPU(2) 322 and CPU(3) 323). A workgroup scheduler 325 receives one or more dispatch packets from respective dispatch controllers and forwards the information provided therein to the identified execution units of the secondary processing resource(s) 204. In the illustrated embodiment, the secondary processing resource(s) 204 is arranged with execution unit (0) 340 through execution unit (N) 348 where N is an integer. Note that the execution units 340-348 may be similarly arranged and associated with a single DSP or GPU or the execution units may be different types of execution specific to one or both of a DSP, several DSPs, a GPU or several GPUs and/or combinations of these. The integer N indicates that any desired number of execution units can be included in the secondary or alternative processing resource 204.

In the illustrated embodiments, the execution units 340-348 of the secondary processing resource 204 are sub-elements of the DSP 220 and the GPU 225. However, the secondary processing resource 204 is not so limited. Execution units may be sub-elements of other devices such as application specific integrated circuits (ASICs) or even standalone arithmetic logic units distributed across the SoC 120.

As further indicated in FIG. 3, the general process flow through the computing environment 300 is indicated by arrows with a sequence identifier enclosed in a circle. For example, CPU(2) 322 in response to a detected offload condition generates a request, depicted by arrow 1, which is communicated to dispatch controller DC(2) 332. In response, DC(2) 332 generates a dispatch packet, depicted by arrow 2, which is forwarded to the workgroup scheduler 325. In turn, the workgroup scheduler 325 forwards the information included in the dispatch packet to the execution unit identified in the dispatch packet, as shown by arrow 3. As also identified in the dispatch packet, the execution unit (0) 340 is directed to use the information stored in a defined range 245 of the shared virtual memory 240. The defined range 245 of the virtual memory 240 includes the context of the offloaded or dispatched thread. Upon completion of the defined work (as also defined in the dispatch packet), the execution unit (0) 340 leaves a modified version of the information in the defined range 245 of the shared virtual memory 240 for additional processing by the primary processing resource 202. In addition, the execution unit (0) 340 sends an indication that the thread or task is complete to the work scheduler 325, as indicated by arrow 4. The workgroup scheduler 325 records the task/thread completion and sends an indication of the same to the dispatch controller DC(2) 322 as indicated by arrow 5. In turn, and as shown by arrow 6, DC(2) 322 forwards an indication that the task/thread is complete to the CPU(2) 322. The primary or host processing resource 202 waits for the task complete signal from the dispatch controller, and upon receipt of the task complete signal, resumes execution of the suspended thread.

Figure 6:
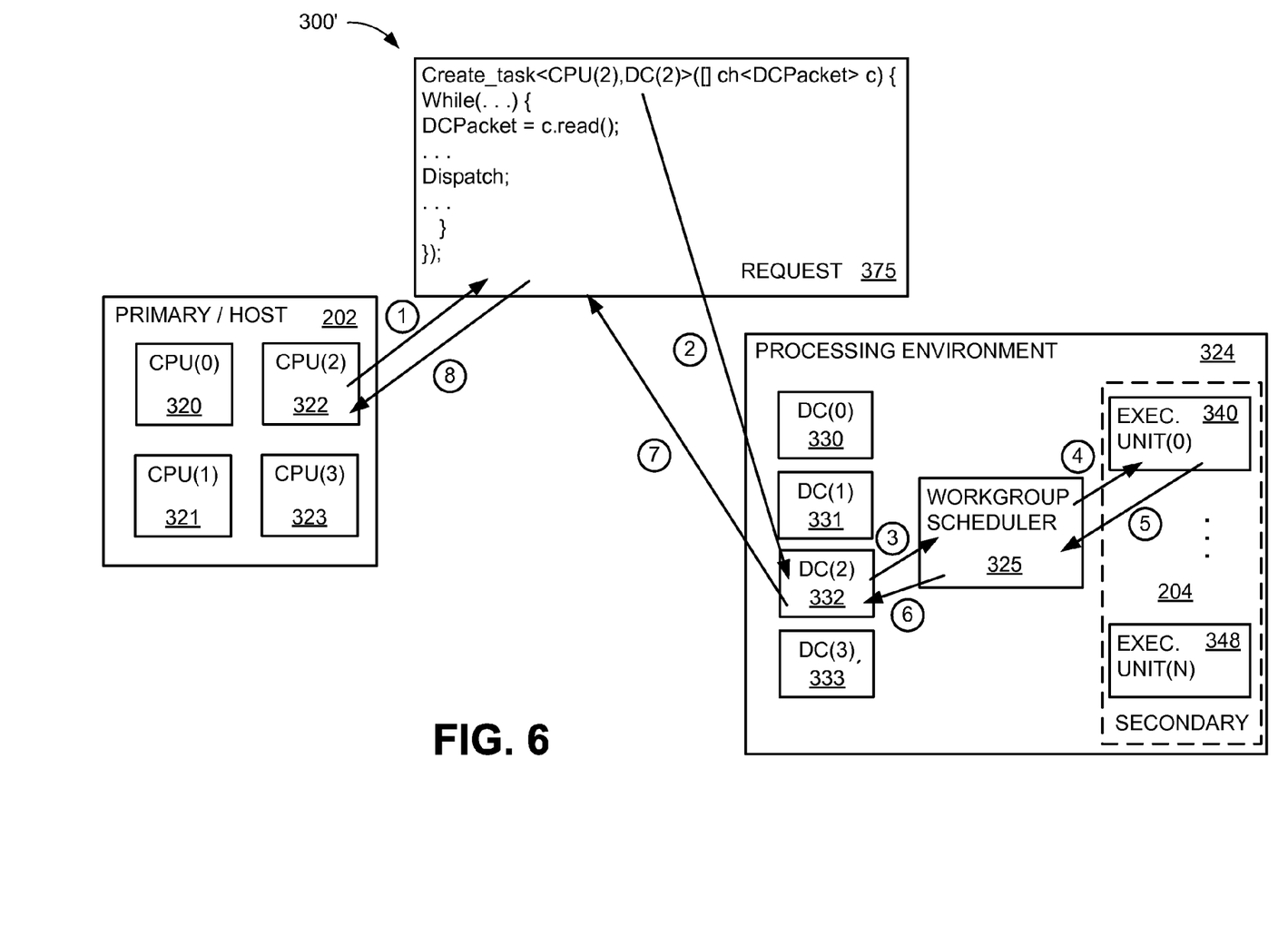
FIG. 6 is a schematic diagram illustrating an example embodiment of a user mode scheduled task with the computing environment introduced in FIG. 3.

FIG. 6 is a schematic diagram illustrating an example embodiment of a user mode scheduled task with the computing environment 300 introduced in FIG. 3. As shown in the computing environment 300' of FIG. 6, the request 375 (to offload the thread communicated from the CPU(2) 322 to the DC(2) 332) appears as a function call, which includes a defined application binary interface (ABI) and arguments that are passed to the defined dispatch controller (i.e., DC(2) 332). In the illustrated user mode scheduled task, the request 375, which was depicted in FIG. 3 with arrow 1, is replaced by arrow 1 and arrow 2. The processing sequence thereafter is the same as shown in FIG. 3 through the processing environment 324 with the DC(2) 332 interacting with the workgroup scheduler 325 and the workgroup scheduler 325 further directing the execution unit (0) 340. Similarly, the task completion is signaled in the same manner as in FIG. 3, with the exception that the task or thread complete indication from the DC(2) 332 is depicted by arrow 7 and arrow 8 that together indicate that the task complete signal from the DC(2) 332 terminates the "While logic portion" of the function call represented in the request 375, which termination informs the CPU(2) 322 that the offloaded task/thread is complete. As briefly described, the CPU(2) 322 can continue to execute the thread using the information in the defined range 245 of the shared virtual memory 240 as modified by the execution unit (0) 340.

Figure 4:
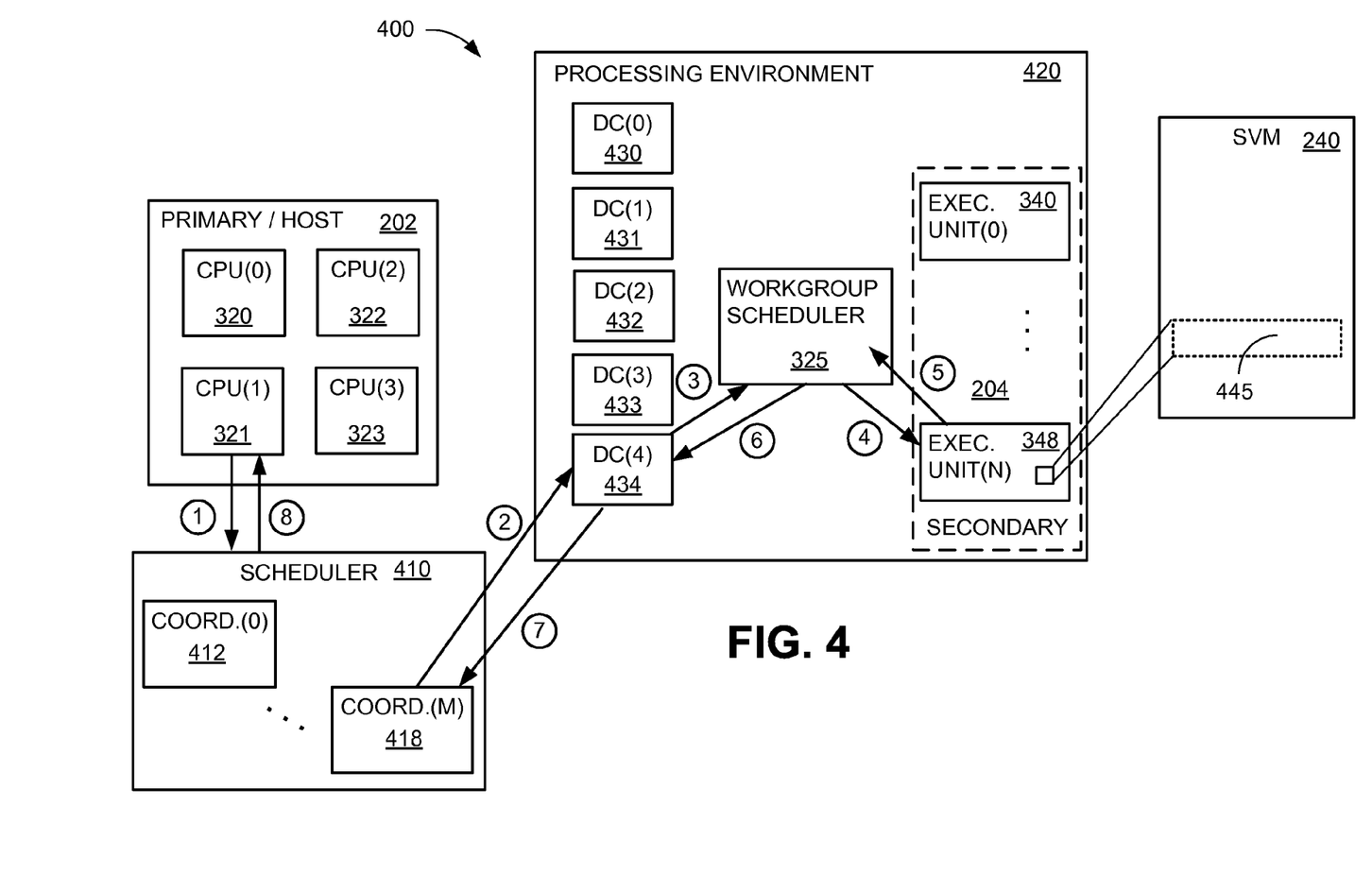
FIG. 4 is a schematic diagram illustrating another example embodiment of a computing environment that manages the dispatch of tasks in the SoC of FIG. 1.

FIG. 4 is a schematic diagram illustrating another example embodiment of a computing environment 400 that manages the dispatch of tasks or threads in the SoC 120 of FIG. 1. The computing environment 400 includes the primary processing resource or host 202, an alternative processing environment 420 and the shared virtual memory 240. The primary processing resource 202 includes multiple CPUs, computing elements or cores. In the illustrated embodiment, the primary processing resource 202 includes CPU(0) 320, CPU(1) 321, CPU(2) 322 and CPU(3) 323. However, it should be understood that fewer computing elements, more computing elements or a blend of various different computing elements can be included in the host or primary processing resource 202 within a PCD 100.

The processing environment 420 includes a set of dispatch controllers (i.e., DC(0) 430, DC(1) 431, DC(2) 432, DC(3) 433 and DC(4) 434). Thus, the CPUs of the primary processing resource 202 are no longer in a one-to-one relationship with the dispatch controllers, (i.e., DC(0) 430, DC(1) 431, DC(2) 432 and DC(4) 433). A workgroup scheduler 325 receives one or more dispatch packets from respective dispatch controllers and forwards the information provided therein to the identified execution units of the secondary processing resource(s) 204. In the illustrated embodiment, the secondary processing resource(s) 204 is arranged with execution unit (0) 340 through execution unit (N) 348 where N is an integer. Note that the execution units 340-348 may be similarly arranged and associated with a single DSP or GPU or the execution units may be different types of execution specific to one or both of a DSP, several DSPs, a GPU or several GPUs and/or combinations of these. The integer N indicates that any desired number of execution units can be included in the secondary or alternative processing resource 204.

In the computing environment 400 illustrated in FIG. 4, a scheduler 410 asynchronously receives offload requests from the primary processing resource 202. The scheduler 410 includes multiple instances or copies of coordinators such as coordinator (0) 412 and coordinator (M) 418. The coordinators 412-418, which may be implemented in hardware and/or software synchronously offload thread requests to the one or more instances or copies of dispatch controllers (i.e., DC(0) 430, DC(1) 431, DC(2) 432 and DC(4) 433). Consequently, in this arrangement the dispatch controllers are in a one-to-one relationship with the coordinators.

As further indicated in FIG. 4, the general process flow through the computing environment 300 is indicated by arrows with a sequence identifier enclosed in a circle. For example, CPU(1) 321 in response to a detected offload condition generates a request, depicted by arrow 1, which is communicated to the scheduler 410. The scheduler 410 in response to present conditions on the PCD 100 and one or more executing algorithms forwards the offload request to coordinator (M) 418, which in turn and as shown by arrow 2, communicates the offload request to dispatch controller DC(4) 434. In response, DC(4) 434 generates a dispatch packet, depicted by arrow 3, which is forwarded to the workgroup scheduler 325. In turn, the workgroup scheduler 325 forwards the information included in the dispatch packet to the execution unit identified in the dispatch packet, as shown by arrow 4. As identified in the dispatch packet, the execution unit (N) 348 is directed to use the information stored in a defined range 445 of the shared virtual memory 240. The defined range 445 of the virtual memory 240 includes the context of the offloaded or dispatched thread.

Upon completion of the defined work (as also defined in the dispatch packet), the execution unit (M) 348 leaves a modified version of the information in the defined range 445 of the shared virtual memory 240 for additional processing by the primary processing resource 202. In addition, the execution unit (M) 348 sends an indication that the thread or task is complete to the work scheduler 325, as indicated by arrow 5. The workgroup scheduler 325 records the task/thread completion and sends an indication of the same to the dispatch controller DC(4) 434 as indicated by arrow 6. In turn and as shown by arrow 7, DC(4) 434 forwards an indication that the task/thread completion to the CPU(1) 321.

The coordinators 412-418 are global to the processing environment and can communicate with dispatch controllers 430-434 as may be desired to offload tasks or threads from a primary processing resource to a second or alternative processing resource. The coordinators 412-418 can be executed directly by a micro-scheduler such as the scheduler 410 and can be exposed to developers and programmers via one or more domain specific languages. The coordinators 412-418, when deployed together with the described CPUs 320-323 provide the ability to construct and manage two-levels or layers of scheduling within the PCD 100.

Figure 7:
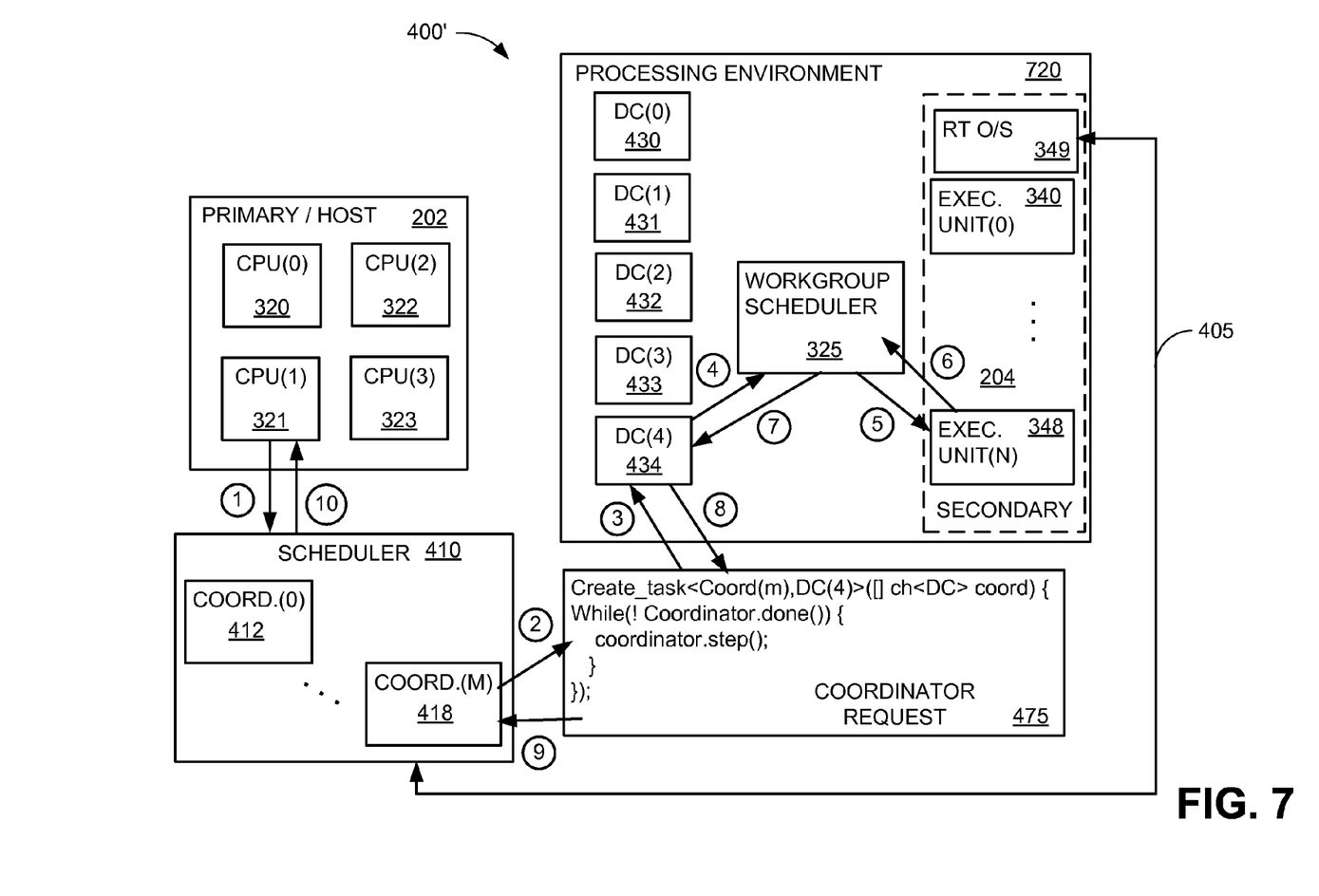
FIG. 7 is a schematic diagram illustrating a coordinator managed task with the computing environment introduced in FIG. 4.

FIG. 7 is a schematic diagram illustrating an example embodiment of a user mode scheduled coordinator enabled task with the computing environment 400 introduced in FIG. 4. In addition to the elements shown in FIG. 4, the computing environment 400' and more specifically the alternative processing environment 720 includes a RTOS 349 which communicates via connection 405 with the scheduler 410. The connection 405 is a two-way communication path that enables the RTOS 349 and the scheduler 410 to controllably execute offloaded tasks or threads. As shown in the computing environment 400' of FIG. 7, the coordinator request 475 (to offload the thread communicated from the CPU(1) 321 to the DC(4) 434) appears as a function call, which includes a defined application binary interface (ABI) and arguments that are passed to the defined dispatch controller (i.e., DC(4) 434). In the illustrated user mode scheduled coordinator enabled task, the coordinator request 475, which was depicted in FIG. 3 with arrow 2, is replaced by arrow 2 and arrow 3. The processing sequence thereafter is the same as shown in FIG. 4 with the DC(4) 434 interacting with the workgroup scheduler 325 and the workgroup scheduler 325 further directing the execution unit (N) 348. Similarly, the task or thread completion is signaled in the same manner as in FIG. 4, with the exception that the task or thread complete indication from the DC(4) 434 is depicted by arrow 9 and arrow 10 that together indicate that the task complete signal from the DC(4) 434 terminates the "While logic portion" of the function call represented in the coordinator request 475, which termination informs the CPU(1) 321 that the offloaded task/thread is complete. Thereafter, the CPU(1) 321 can continue to execute the thread using the information in the defined range 445 of the shared virtual memory 240 as modified by the execution unit (M) 348 and or signal an O/S that the thread is complete.

Figure 5:
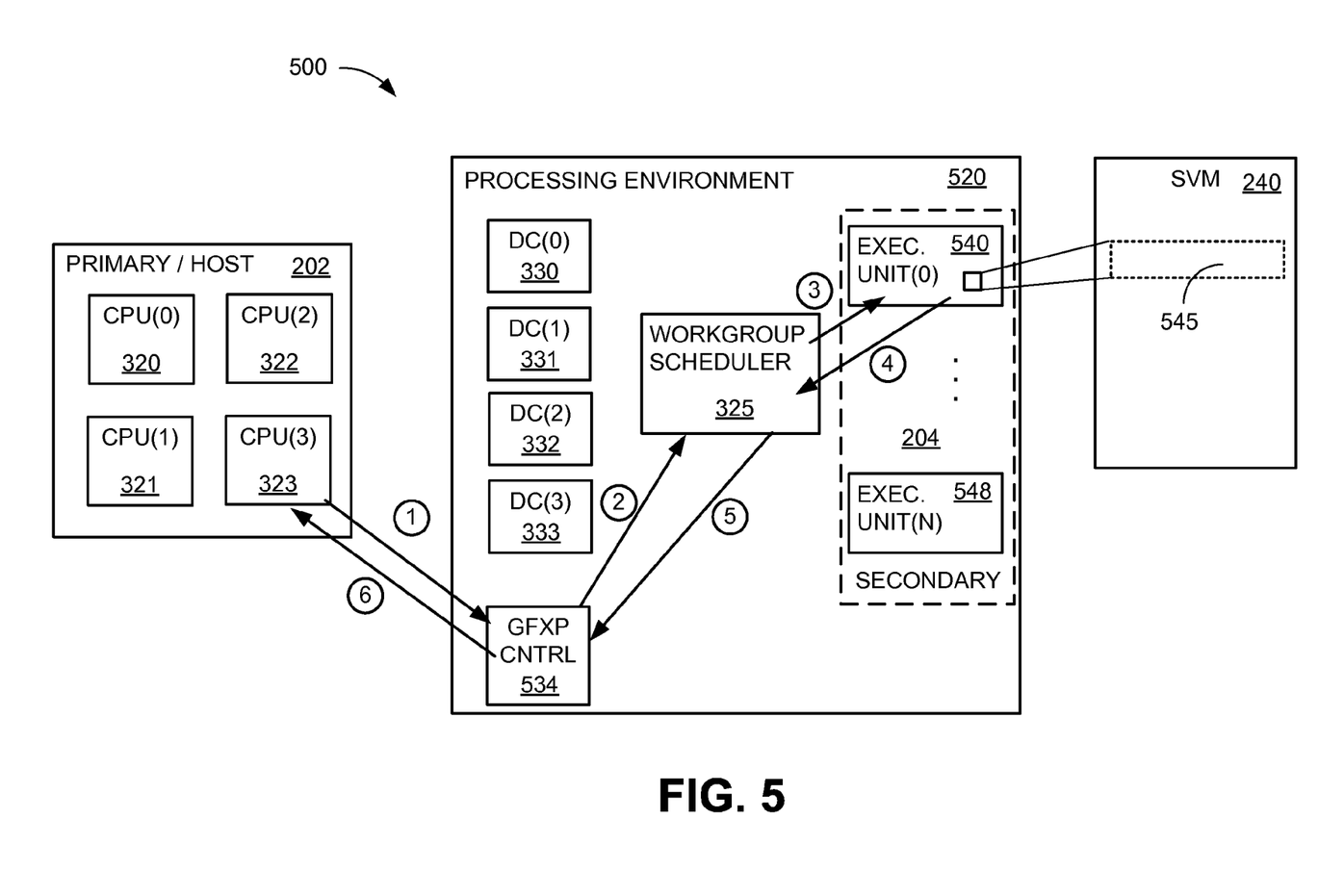
FIG. 5 is a schematic diagram illustrating a third example embodiment of a computing environment that manages the dispatch of tasks in the SoC of FIG. 1.

FIG. 5 is a schematic diagram illustrating a third example embodiment of a computing environment 500 that manages the dispatch of tasks or threads in the SoC 120 of FIG. 1. In this arrangement the processing environment 520 is arranged with a graphics processing unit specific controller 534 in place of an instance of a DC(X). Such an arrangement permits the workgroup scheduler 325 to independently and concurrently process graphics commands with non-graphics type threads. In addition, such an arrangement permits the workgroup scheduler 325 to prioritize one type of thread (e.g., a graphics thread) over others. Note that although one graphics processing unit specific controller 534 is shown, the processing environment 520 is not so limited and may include any desired number of graphics processing unit specific controllers.

As in the other illustrated embodiments, each instance or copy of a graphics processing unit specific controller 534 is available to receive a request from a primary processing resource 202 to offload a task or thread. The request is issued or signaled by the primary processing resource 202 in response to one or more signals or conditions. The graphics processing unit controller 534 executes a scheduler (not shown) capable of initiating a dispatch command responsive to the request.

As further indicated in FIG. 5, the general process flow through the computing environment 500 is indicated by arrows with a sequence identifier enclosed in a circle. For example, CPU(3) 323 in response to a detected offload condition generates a request, depicted by arrow 1, which is communicated to the graphics processing unit specific controller 534. In response, the graphics processing unit specific controller 534 generates a dispatch packet, depicted by arrow 2, which is forwarded to the workgroup scheduler 325. In turn, the workgroup scheduler 325 forwards the information included in the dispatch packet to the execution unit identified in the dispatch packet, as shown by arrow 3. As also identified in the dispatch packet, the execution unit (0) 540 is directed to use the information stored in a defined range 545 of the shared virtual memory 240. The defined range 545 of the virtual memory 240 includes the context of the offloaded or dispatched thread. Upon completion of the defined work (as also defined in the dispatch packet), the execution unit (0) 540 leaves a modified version of the information in the defined range 545 of the shared virtual memory 240 for additional processing by the primary processing resource 202. In addition, the execution unit (0) 540 sends an indication that the thread or task is complete to the work scheduler 325, as indicated by arrow 4. The workgroup scheduler 325 records the task/thread completion and sends an indication of the same to the graphics processing unit specific controller 534 as indicated by arrow 5. In turn and as shown by arrow 6, the graphics processing unit specific controller 534 forwards an indication that the task/thread is complete to the CPU(3) 323. As described, the graphics processing unit specific controller provides a means or mechanism for scheduling the processing of graphics commands by the GPU 225.

Figure 8:
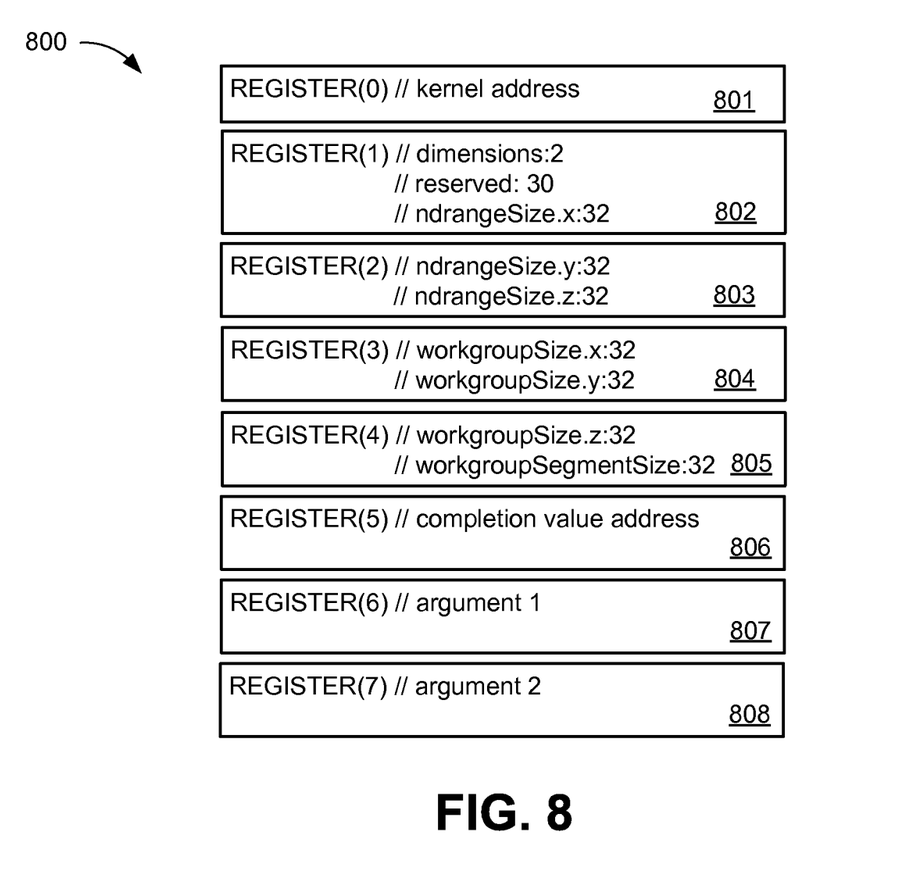
FIG. 8 is a schematic diagram illustrating the use of a set of registers to define a dispatch packet.

FIG. 8 is a schematic diagram illustrating the use of a set of registers to define a dispatch packet. The dispatch packet defines an application binary interface (ABI) 800 for communicating with secondary processing resources. As indicated in FIG. 8, the ABI 800 is a set of registers arranged in a particular manner. For example, the ABI may include a set with a desired number of registers. That is, the ABI may be defined by an integer number of registers for storing information used by the secondary processing resources. For example, register 801 includes a kernel address. Register 802 includes 2-bits for identifying the number of dimensions of work space, a number of reserved bits, and the size of the x dimension of the work space. Register 803 includes bits that identify the size of the y-dimension and the z-dimension of the workspace. Register 804 identifies a workgroup size for the x and y dimensions. Register 805 identifies a workgroup size for the z dimension and work group segment size. Register 806 includes a completion value address, while register 807 and register 808 define respective arguments that can be communicated to the secondary processing resource. It is possible that alternative registers could be used to optimize argument transfers and that various encoding techniques and/or processing rules could be implemented to block calls to the dispatch controller 212.

Figure 9:
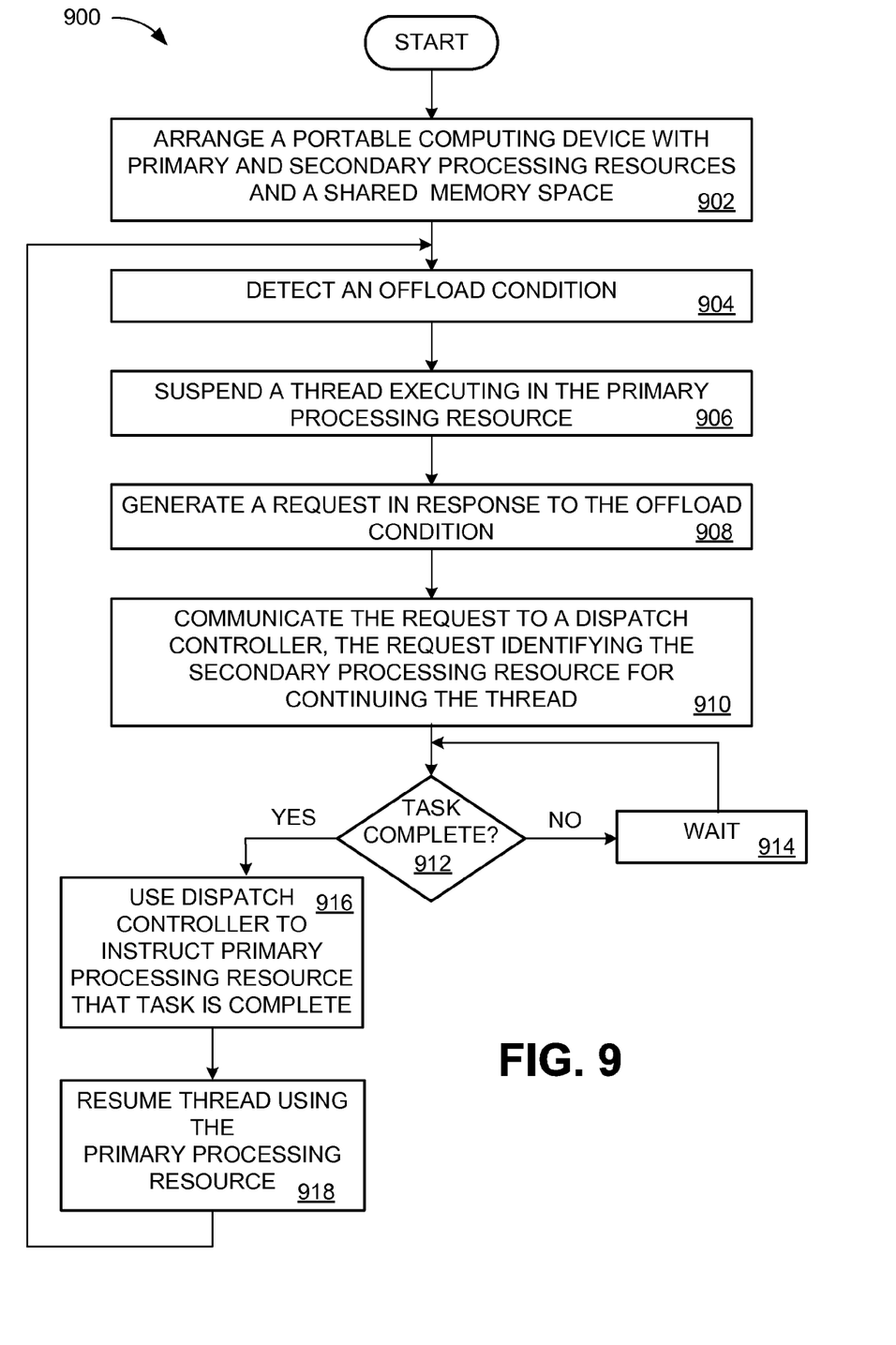
FIG. 9 is a flow diagram of an example embodiment of a method for synchronous task dispatch in a SoC.

FIG. 9 is a flow diagram of an example embodiment of a method 900 for synchronous task dispatch in a SoC 120. As illustrated, the method 900 starts with block 902 where a portable computing device 100 is arranged with primary and secondary processing resources that share a memory space 240. In block 904, the primary processing resource 202 or other detectors or sensors arranged on the PCD 100 detect an offload condition. In response to the offload condition, a thread executing in the primary processing resource 202 is suspended as indicated in block 906. The primary processing resource 202 generates a request in response to the offload condition and/or confirmation of suspension of the executing thread, as indicated in block 908. As further shown in block 910, the request is communicated to a dispatch controller 212. The step of communicating the request to the dispatch controller includes communicating at least one location in the shared memory space (i.e., the SVM 240) accessible to the primary processing resource 202 and the secondary processing resource 204 where information associated with the thread is presently stored. As described, the request identifies a secondary processing resource suitable for the continuing execution of the previously suspended thread. As also described, the shared memory space is leveraged so that contextual information associated with the suspended thread can be easily used by the secondary or alternative processing resource and upon completion can be simply transferred back to the primary processing resource when further processing by that resource is required or desired.

When the offloaded thread or task is still processing, as indicated in the arrow labeled, "No" exiting decision block 912, and block 914, the query is repeated upon completion of a wait command. Otherwise, as indicated in block 916, the dispatch controller 212 is used to instruct the primary processing resource that the task or thread is complete. Thereafter, as indicated in block 918, the primary processing resource 202 resumes the thread and the functions of blocks 904 through 918 are repeated as desired.

As illustrated and described a primary processing resource or host 202 provides a mechanism for processing a thread. A thread is the smallest sequence of instructions that can be managed independently by an O/S or controller. As further described one or more dispatch controllers 212 or one or more graphics processing specific controllers 334 provide a mechanism for synchronously offloading or dispatching an identified thread as instructed in a request issued or communicated from the primary processing resource 202. As also illustrated and described a secondary or alternative processing resource such as DSP, a GPU, a FPGA, an ALU, etc. provides a mechanism for executing the offloaded thread as directed by a dispatch packet.

As described, the one or more non-transitory processor or computer-readable medium or media may have stored thereon processor instructions that when executed direct the processor to perform desired functions of detecting a task offload condition, suspending execution of a thread executing in a primary processing resource, generating a request in response to the offload condition, communicating the request to a dispatch controller, the request identifying a secondary processing resource different from the primary processing resource for execution of the thread. The function of communicating the request to the dispatch controller may include defining an application binary interface that directs the secondary processing resource where to locate thread related items presently stored in a shared memory space.

Certain steps in the processes or process flows described in this specification naturally precede others for the invention to function as described. However, the present system and methods are not limited to the order of the steps described if such order or sequence does not alter the functionality of the above-described systems and methods. That is, it is recognized that some steps may be performed before, after, or in parallel (substantially simultaneously) with other steps. In some instances, certain steps may be omitted or not performed without departing from the above-described systems and methods. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed elements and functions without difficulty based on the flow charts and associated examples in this specification. Therefore, disclosure of a particular set of program code instructions or detailed hardware devices is not considered necessary for an adequate understanding of how to make and use the systems and methods. The functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored as one or more instructions or code on a computer-readable medium, such as a non-transitory processor-readable medium. Computer-readable media include data storage media.

A storage media may be any available media that may be accessed by a computer or a processor. By way of example, and not limitation, such computer-readable media may include RAM, ROM, EEPROM, Flash, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present systems and methods, as defined by the following claims.

What is claimed is:

1. A computing device, comprising:
   a primary processing resource located in a system on a chip;
   a dispatch controller located in the system on a chip, the dispatch controller in communication with the primary processing resource;
   a plurality of secondary processing resources located in the system on a chip in communication with the dispatch controller, the plurality of secondary processing resources arranged to communicate indirectly with the primary processing resource via the dispatch controller, the dispatch controller arranged to synchronously manage a request from the primary processing resource for a first of the plurality of the secondary processing resources to execute a thread, the request from the primary processing resource identifying the first secondary processing resource;
   a shared memory space electrically coupled and accessible to the primary processing resource and the plurality of secondary processing resources, wherein the primary processing resource and the plurality of secondary processing resources are arranged to generate signals to and respond to signals from a signal/wait interface; and
   a global coordinator coupled to the primary processing resource and arranged to receive the request and asynchronously generate a dispatch command to the dispatch controller that defines a specific execution unit of the first secondary processing resource in response to a task offload condition.

2. The computing device of claim 1, wherein the request from the primary processing resource includes information about a type of secondary processing resource to be used to execute the thread.

3. The computing device of claim 2, wherein the primary processing resource suspends execution of the thread on the primary processing resource before generating the request.

4. The computing device of claim 3, wherein the primary processing resource waits for a task complete signal from the dispatch controller, and upon receipt of the task complete signal, the primary processing resource resumes execution of the thread.

5. The computing device of claim 4, wherein the request directs the dispatch controller to provide information that enables the first secondary processing resource to execute the thread.

6. The computing device of claim 4, wherein the task complete signal from the dispatch controller is communicated to an operating system.

7. The computing device of claim 1, wherein the global coordinator executes a micro-scheduler capable of initiating the dispatch command responsive to the request.

8. The computing device of claim 1, further comprising:
   a graphics processing unit specific controller coupled to the primary processing resource and arranged to asynchronously receive the request in response to a task offload condition.

9. The computing device of claim 8, wherein the graphics processing unit specific controller executes a scheduler capable of initiating a dispatch command responsive to the request.

10. The computing device of claim 1, further comprising:
    a digital signal processor arranged with a real-time operating system to asynchronously receive the request in response to a task offload condition.

11. The computing device of claim 1, wherein the dispatch controller is a hardware element.

12. The computing device of claim 1, wherein the dispatch controller is enabled in software.

13. The computing device of claim 1, wherein a first set of one or more functions of the dispatch controller are enabled in a hardware element and remaining functions of the dispatch controller are enabled in software.

14. A method for synchronous task dispatch in a portable computing device, comprising:
    providing the portable computing device with a primary processing resource, a dispatch controller in communication with the primary processing resource, a plurality of secondary processing resources in communication with the dispatch controller, and a shared memory space accessible to the primary processing resource and the plurality of secondary processing resources by a bus, the primary processing resource and the plurality of secondary processing resources arranged in a system on a chip and arranged to generate signals to and respond to signals from a signal/wait interface;

detecting a task offload condition;

suspending execution of a thread executing in the primary processing resource;

generating a request from the primary processing resource in response to the task offload condition, the request identifying a first of the plurality of the secondary processing resources for execution of the thread;

communicating the request to the dispatch controller, the dispatch controller arranged to synchronously manage the request for the first secondary processing resource from the primary processing resource, wherein communicating the request to the dispatch controller includes communicating at least one location in the shared memory space accessible to the primary processing resource and the first secondary processing resource where information associated with the thread is presently stored.

15. The method of claim 14, wherein the signal/wait interface includes instructions.

16. The method of claim 14, wherein the primary processing resource waits for a task complete signal from the dispatch controller and upon receipt of the task complete signal, the primary processing resource resumes execution of the thread.

17. The method of claim 14, wherein the primary processing resource waits for a task complete signal from the dispatch controller before signaling an operating system that the thread is complete.

18. The method of claim 14, wherein communicating the request to the dispatch controller includes using a graphics processing unit specific controller coupled to the primary processing resource and arranged to asynchronously receive the request in response to a task offload condition.

19. The method of claim 18, wherein the graphics processing unit specific controller executes a scheduler capable of initiating a dispatch command directed to the secondary processing resource.

20. The method of claim 14, wherein communicating the request to the dispatch controller includes using a digital signal processor arranged with a real-time operating system to asynchronously receive the request from the primary processing resource in response to the task offload condition.

21. A computing device, comprising:
a first means for processing a thread, the first means including a mechanism for detecting a task offload condition and a mechanism for generating a request to offload processing of the thread;
a means for synchronously dispatching the thread responsive to the task offload condition and the request to offload;
a plurality of second means for processing the thread responsive to the means for synchronously dispatching the thread in communication with the means for synchronously dispatching, wherein the request to offload from the first means for processing identifies a first of the plurality of second means for processing; and
a shared memory space accessible to the first means and the first second means over a bus, the first means and the plurality of second means enabled in a system on a chip and enabled to generate signals to and respond to signals from a signal/wait interface, wherein the mechanism for generating the request includes communicating at least one location in the shared memory space accessible to the first means for processing and the first second means for processing where information associated with the thread is presently stored.

22. The computing device of claim 21, wherein the request to offload from the first means for processing the thread includes information about a type of the second means for processing to be used to execute the thread.

23. The computing device of claim 22, wherein the first means for processing the thread suspends execution of the thread before communicating the request to the means for synchronously dispatching the thread.

24. The computing device of claim 22, wherein the first means for processing the thread waits for a task complete signal from the means for synchronously dispatching the thread before resuming execution of the thread.

25. The computing device of claim 24, wherein the first means for processing the thread forwards an indication that the task complete signal was received to an operating system.

26. A non-transitory processor-readable medium having stored thereon processor instructions that when executed direct the processor to perform functions, comprising:
detecting a task offload condition;
suspending execution of a thread executing in a primary processing resource;
generating a request in response to the task offload condition, the request identifying a first of a plurality of second processing resources to execute the thread;
communicating the request to a dispatch controller in communication with the plurality of second processing resources, the dispatch controller arranged to synchronously manage requests for the plurality of secondary processing resources from the primary processing resource, the primary processing resource and the plurality of secondary processing resources arranged in a system on a chip and arranged to generate signals for and respond to signals from a signal/wait interface; and
using a shared memory space accessible to the primary processing resource and the plurality of secondary processing resources over a bus to transfer a context of the thread, wherein communicating the request to the dispatch controller comprises defining an application binary interface that directs the first secondary processing resource where to locate thread related items in a shared memory space.

27. The non-transitory processor-readable medium of claim 26, wherein the application binary interface comprises a set of N registers, where N is an integer.

* * * * *